J. ACHEL.
GEAR MECHANISM.
APPLICATION FILED SEPT. 20, 1915.
1,178,482.
Patented Apr. 11, 1916.
2 SHEETS—SHEET 1.
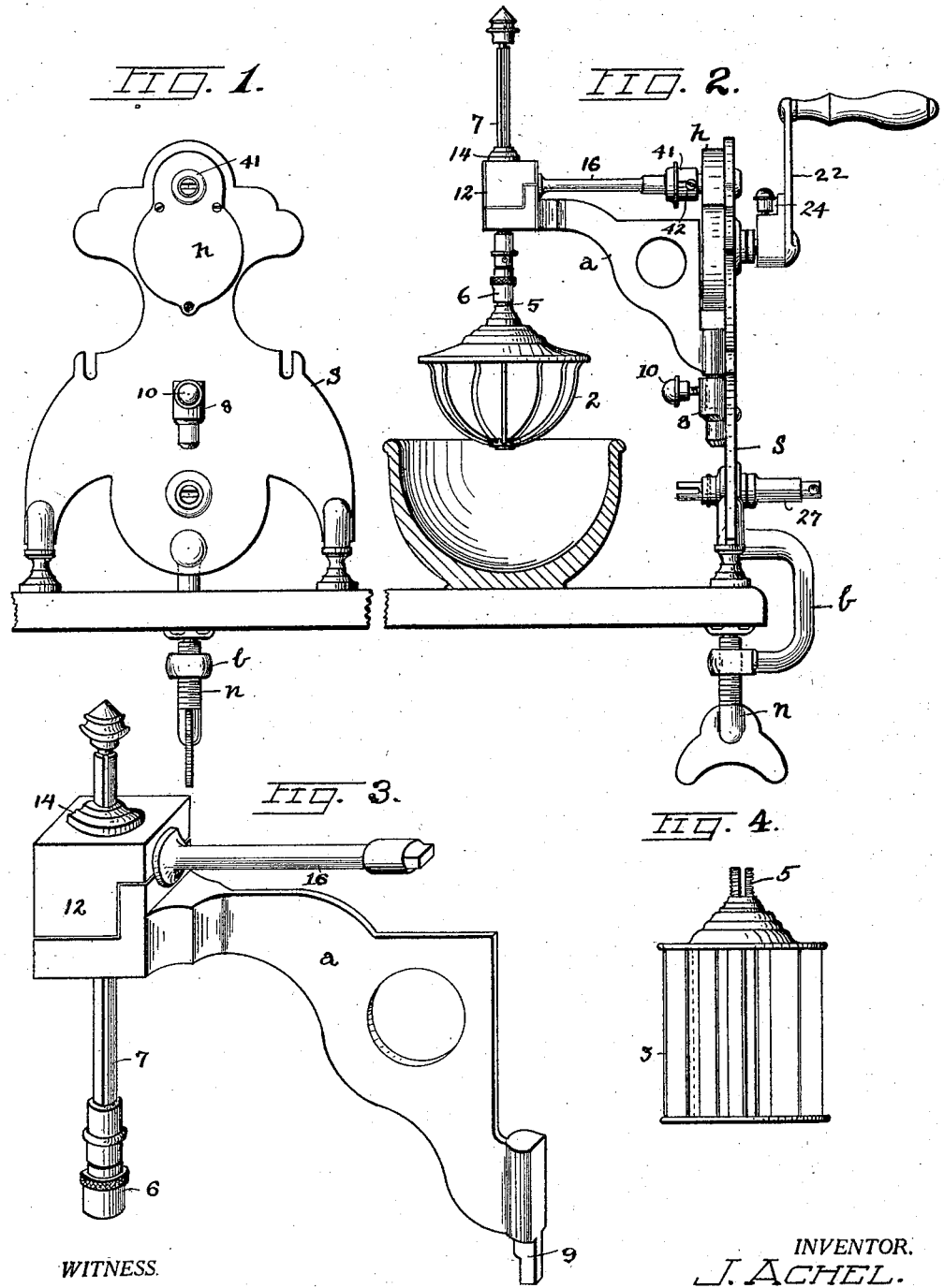
WITNESS.
Geo. E. Kricker.
INVENTOR.
J. ACHEL.
BY Fisher & Moser
ATTORNEYS.

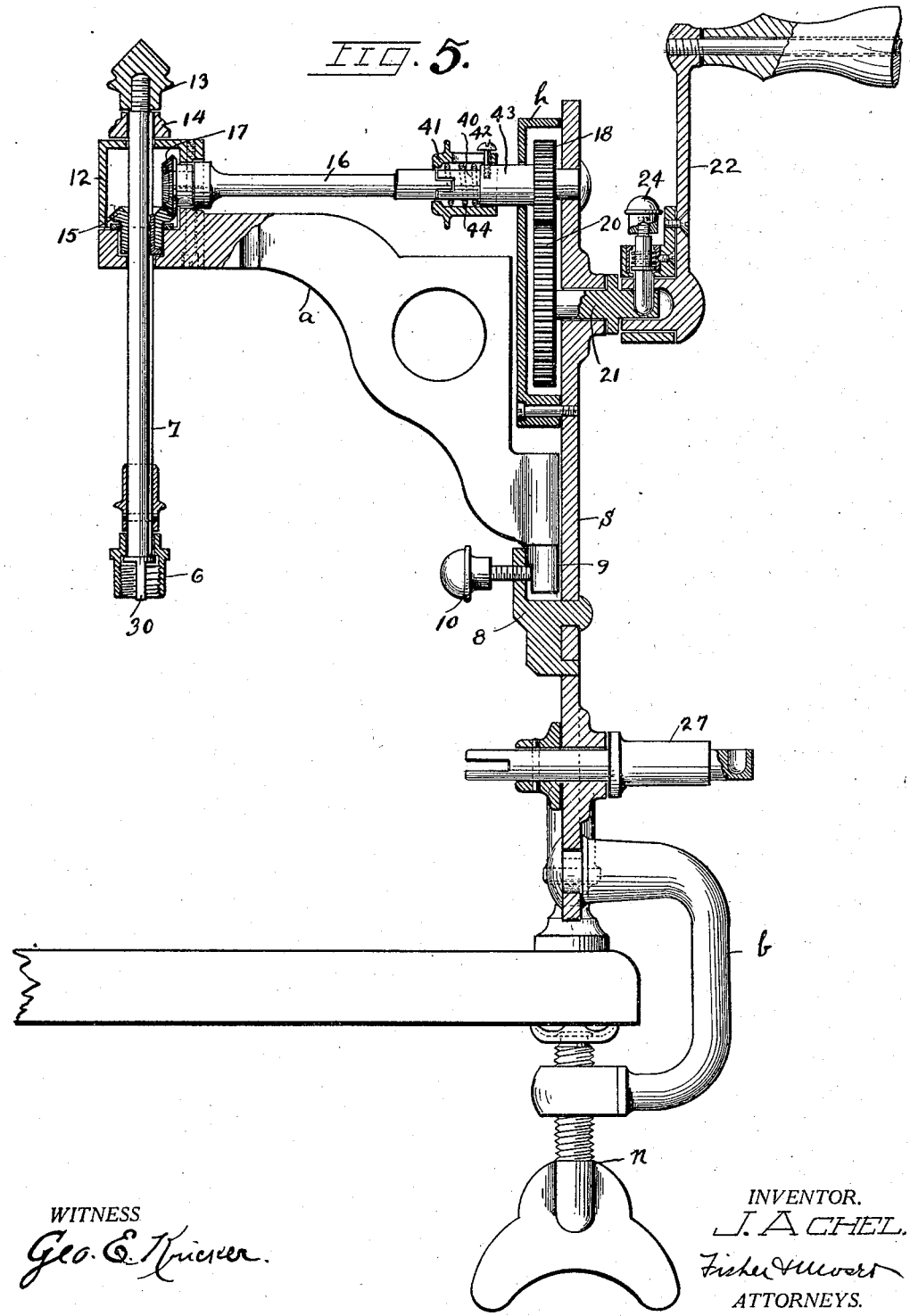

UNITED STATES PATENT OFFICE.

JOZSEF ACHEL, OF CLEVELAND, OHIO, ASSIGNOR OF ONE-HALF TO JACOB HOLLANDER, OF CLEVELAND, OHIO.

GEAR MECHANISM.

1,178,482.  Specification of Letters Patent.  Patented Apr. 11, 1916.

Application filed September 20, 1915. Serial No. 51,573.

*To all whom it may concern:*

Be it known that I, JOZSEF ACHEL, a subject of Hungary, residing at Cleveland, in the county of Cuyahoga and State of Ohio, have invented certain new and useful Improvements in Gear Mechanism, of which the following is a specification.

My invention consists in gear mechanism, substantially as shown and described.

In the accompanying drawings, Figure 1 is a front elevation of a supporting standard for my device. Fig. 2 is an edge elevation of the said standard and operating mechanism supported thereon. Fig. 3 is a perspective view of the supporting arm and a spindle and actuating shaft thereon. Fig. 4 is a side elevation of one of the beating tools. Fig. 5 is an enlarged vertical sectional elevation of the complete device less the beater or beating tool or implement.

As thus shown the device is designed to be variously adaptable to use for beating eggs and milk for making butter in small quantities in bowls from cream and for other purposes in kitchen use as a housewife may require. It may be noticed, also, that the standard S shown herein is the same as the corresponding standards shown in my companion application for improvements in domestic vegetable cutters of even date and bearing Ser. No. 51,572. The said standard S is seen in elevation Fig. 1 and is adapted to be fixed on a table or other suitable support and is secured thereto, in this instance, by a bracket *b* and a thumb screw *n* to rigidly affix the same.

The tool or implement of whatever character, as an egg whipper 2, Fig. 2, or a milk beater 3, Fig. 4, is provided with a shank 5 in either or any case adapted to be operatively engaged by means of a rotatable internally threaded socket 6 with or upon the actuating spindle 7; the said spindle is rotatably mounted in the outer end of an arm *a* removably supported by a socket 8 on the standard and a tenon 9 on said arm seated in said socket and locked by screw 10.

The spindle 7 is slidably mounted in the extremity of said arm, which has a box support 12 therefor on the arm with a nut 13 on its end resting on the arm and a collar 14 resting on the box 12, and a bevel gear 15 is seated in the bottom of said box and engages a longitudinal groove in said spindle so as to rotate the same at whatever elevation the spindle may be raised. A horizontally disposed drive shaft 16 has a bevel gear 17 meshing with gear 15 to drive the same, and said shaft has an end section mounted on the inside and top of standard S within housing *h* and carrying a pinion 18 as will presently be seen. A gear 20 meshes with pinion 18 and is supported on a short shaft 21 in standard 3 and which is operatively engaged by the crank handle 22. The said handle has a socket head removably mounted on shaft 21 and engaged therewith by a spring pressed pin 24 projecting through said head and engaged in a cavity in the end of said spindle. The said handle or crank is thus made readily removable for use with the cutting mechanism above referred to and at which time it is engaged with the shaft 27 shown below on standard S but forming no part of the present invention. The said standard is thus shown as serving all the purposes of both the inventions referred to herein and is used with both and with the same handle. Respecting the spindle 7, it will be seen that it has a flat sided tenon 30 and that the shank 5 of the beater, Fig. 4, has an open slot adapted to be inserted over said tenon while the socket nut 6 is rotatable on spindle 7 and engages the said parts firmly together.

Referring now more particularly to shaft or shaft section 16 and its operating connections, it will be seen that the said shaft has a tenon engaged in an open slot in a driving connection 40 and a confining sleeve 41 over the union of said parts has a slot and a screw 42 in said slot is engaged in the enlargement 43 which carries pinion 18 and a spiral spring 44 within said sleeve bears against said enlargement and holds the sleeve over said joint in confining relations. Uncoupling or disengagement of the joint is effected by withdrawing said sleeve and releasing the shaft section 16, and the arm *a* may be removed at the same time to make the exchange for the cutter mechanism of the companion application herein referred to.

What I claim is:

1. A device as described having a standard and a socket on the inside thereof, an arm removably seated in said socket, and a spindle supported in the outer end of said arm, in combination with drive mechanism for said spindle comprising a sectional shaft mounted on said arm at one end and on said standard at the other, a pinion on said shaft and a gear and means to actuate the same adapted to rotate said pinion and shaft, the said shaft having a spring pressed coupling between the sections thereof.

2. A convertible device as described comprising a standard and means at its bottom to fix the same removably to a base, an arm detachably supported from the top portion of said standard, a vertically disposed spindle in the free end of said arm and operating means for said spindle supported on said standard and arm together, and comprising a sectional drive shaft disposed above said arm and operatively connected with said spindle.

In testimony whereof I affix my signature in presence of two witnesses.

JOZSEF ACHEL.

Witnesses:
JAKOB HOLLANDER,
GEO. E. KRICKER.

Copies of this patent may be obtained for five cents each, by addressing the "Commissioner of Patents Washington, D. C."